U. S. SMITH.
AIR BRAKE GOVERNOR.
APPLICATION FILED JAN. 25, 1909.
950,642.
Patented Mar. 1, 1910.
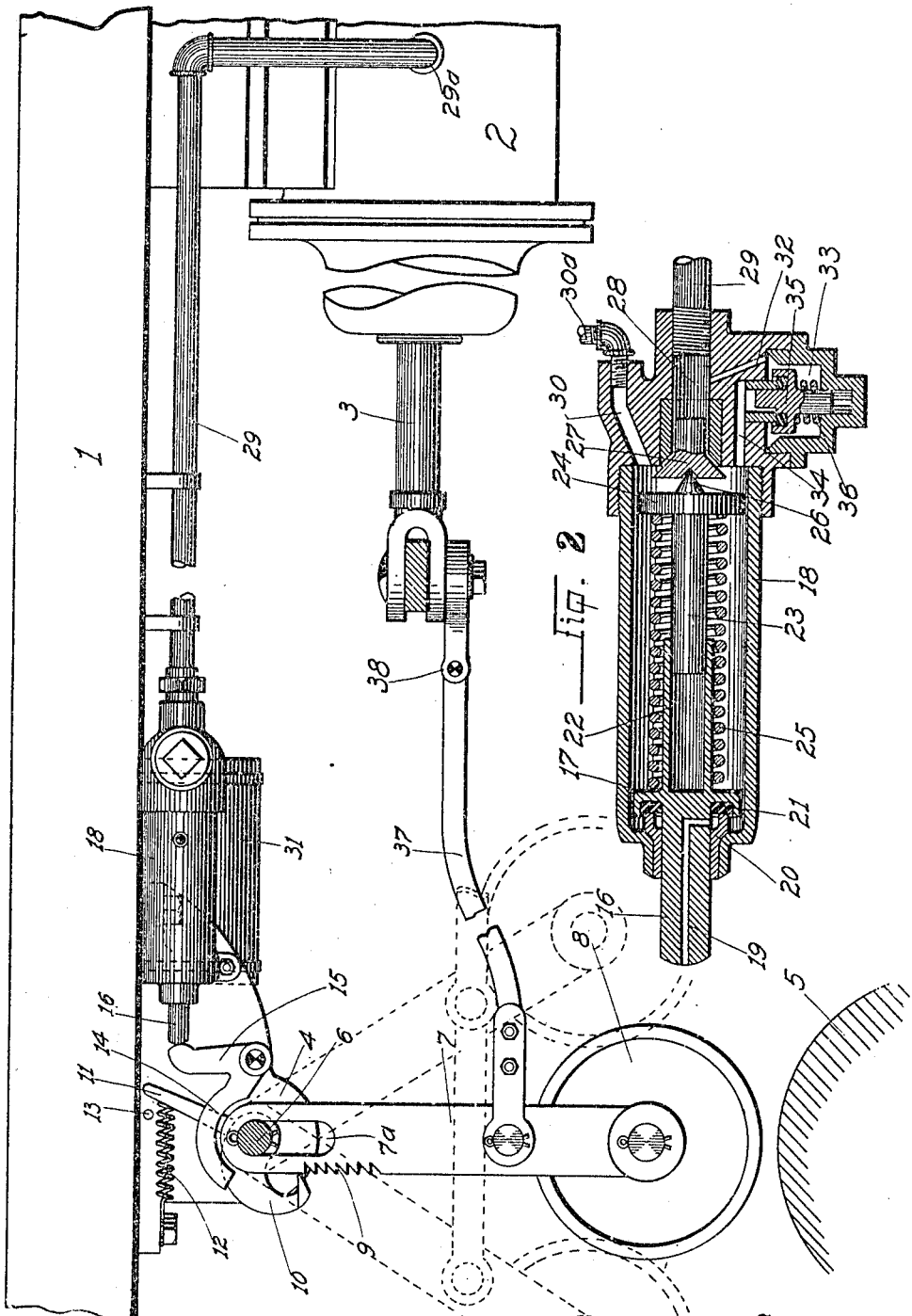

UNITED STATES PATENT OFFICE.

ULYSSES S. SMITH, OF SACRAMENTO, CALIFORNIA.

AIR-BRAKE GOVERNOR.

950,642.  Specification of Letters Patent.  Patented Mar. 1, 1910.

Application filed January 25, 1909. Serial No. 473,998.

*To all whom it may concern:*

Be it known that I, ULYSSES S. SMITH, a citizen of the United States, residing at Sacramento, in the county of Sacramento, State of California, have invented certain new and useful Improvements in Air-Brake Governors; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in air brake systems whereby the percentage of the braking power of the car will be regulated according to the weight of the car, the objects of the present invention being to produce a governor for such load as will govern and regulate the percentage of braking power on empty and loaded cars together.

Under the present system the empty cars brake at about 70 to 80% which at times is too high and hence the wheels slide and consequently wear flat.

The aim of my invention therefore is to reduce this percentage on the empty cars to any desired percentage and use the increased power on the loaded cars to brake the loaded cars at 40% to 60% and reduce this to any desired braking power on the empty cars, and consequently permitting a train to be braked with light reductions in service work this making a saving in air over the present system while the power on the loaded cars will be sufficient to give good control over the train.

I also aim to give the same percentage of braking power on the empty cars as on the loaded cars thus having the braking power uniform throughout the train line.

A further object of the invention is to devise a simple and inexpensive equipment for the purpose and one which can be installed in conjunction with the present brake systems of all kinds thus obviating the necessity of absolute reëquipment.

These objects I accomplish by means of a governor system connected with the brake cylinder whereby the pressure in the brake cylinder is regulated according to the weight of the car there being a governing reservoir to take a portion of the air pressure from the brake cylinder and equalize the same, giving the car a fixed governed braking percentage on the weight of the empty car. As the car is loaded an automatic governing or retarding valve retains the pressure in the brake cylinder according to the weight of the car.

Such other and further structure and relative arrangement of parts are employed as will more fully appear by a perusal of the following specification and claims.

In the drawings similar characters of reference indicate corresponding parts in the several views.

Figure 1 is a side elevation (partly broken out) of my improved equipment, showing the brake rod in the position it assumes when it has made one half its normal travel. Fig. 2 is a sectional view of a regulating governor valve.

Referring now more particularly to the characters of reference on the drawings 1 designates a sill of the car and 2 the brake cylinder attached thereto and having the usual piston and piston rod 3.

4 is a bracket secured to the sill 1 on the center of the car over one of the axles 5 of the car through which bracket is a pin 6 on which is slidably swung a hanger 7 disposed in the lower end of which is a wheel or roller 8, and said hanger is provided with a plurality of ratchets 9 in one edge near the bracket 4 engageable with a dog 10 pivoted on the pin 6 when such hanger 7 moves forward, such dog 10 having an arm 11 having a spring 12 to pull such dog into connection with said ratchets 9 such arm 11 being engageable with a pin 13 to disengage said dog 10 from said ratchets 9 when the hanger 7 moves backward all for the purpose as will appear.

Fulcrumed on the bracket 4 is a lever having one arm 14 projecting over the top of the hanger 7 and the other arm 15 impinging against a rod 14 of a piston 17 disposed in a cylinder 18 such piston 17 being slightly spaced from the sides of the cylinder 18, the rod 16 having a port 19 opening into the cylinder 18 within a bushing 20, the piston 17 carrying a rubber gasket 21 to form a valve seat over the end of said bushing 20.

The piston 17 carries a projecting sleeve 22 within which is slidably disposed a rod 23 carrying a piston 24 spaced slightly from the sides of the cylinder 18 there being a spring 25 interposed between the piston 17 and the piston 24. The piston 24 carries a point 26 impinging upon a valve 27 in a chamber 28 connected with the brake cylinder 2 by a pipe 29 communicating with a port 29ª in said brake cylinder. A port 30 communicates from the cylinder 18 at the front of the piston 24 with a reducing reservoir 31 of such size as to hold enough air to equalize the pressure between it and the cylinder 2 to give and govern the desired percentage of braking power on an empty car as will appear.

A bleed port 32 leads from the port 28 to a valve chamber 33 and a port 34 leads from said valve chamber to said cylinder 18 at the front of said piston 24. The port 34 is controlled by a release valve 35 controlled by a spring 36. Connecting the piston rod 3 and the hanger 7 is a rod 37 having a flexible joint 38.

The operation of my device is as follows: When a service reduction is made the brake piston travels back past the port 29ª and the air escapes through the pipe 29 to the port 28. The spring 25 having on an empty car only sufficient tension to hold the valves 27 and 17 to their seats the air pressure from the cylinder 2 as described above opens the valve 27 and the air passes through the port 28 into the cylinder 18 and thence through the port 30 into the reducing reservoir 31 until the pressure in such reservoir and in the cylinder 2 is equalized thus giving a fixed percentage of brazing power on the empty car which percentage is predetermined by the size of the reservoir 31. While the above operation is taking place the air pressure in the port 28 bleeds through the port 32 and holds the valve 25 closed. When the brake is released, it being necessary to relieve the pressure from the reservoir 31, the air from said reservoir passes through the pipe 30ª, passage 30, cylinder 18, port 34, lifts the valve 35 and thence passes through the chamber 33, port 32, chamber 28, pipe 29 and into the cylinder 2 and thence to the atmosphere through the usual atmospheric release port in the triple valve. In practice the chamber 28 is constructed just large enough to take the air in service application. Therefore, in emergency application, the air is retarded in passing through said chamber 28 to reservoir 31, therefore building up the power in the cylinder 2 on the empty or partly loaded car. This restriction will not retard the air enough to build up the power so as to slide the wheels, but will give a high instantaneous power, which will be a big help in emergency action. As a car is loaded it and all the herein described parts settle downward on the springs of the trucks. Then when the brakes are set the rod 3 moves outward and causes the rod 37 to drive the hanger 7 outward which operates to cause the roller 8 to ride over the axle 5 when the piston has made half its stroke which action causes the hanger 7 to move upward on the pin 6 thus operating the lever 14—15 to drive the rod 16 and piston 17 inward thus compressing the spring 25 and causing the valve 27 to hold the percentage pressure in the brake cylinder according to the weight of the car (since the lower the car drops as it is loaded the more the spring 25 is compressed), any air that does pass said valve 27 escaping to the atmosphere around the pistons 24 and 17 and through the port 19 the same being operated by reason of the movement of the piston 17.

When a full load is on the car the spring 25 is of such tension as to hold the valve 27 against any movement and thus the car receives the full braking strength of all the air pressure in the brake cylinder 2. The tension of the spring 25 is maintained while the piston 3 is making its full travel by means of the action of the dog 10 in the ratchets 9 as described and is released when the rod 3 returns to normal position by means of the releasing pin 13 as described above. The ratchet rack 9 in hanger 7 is so arranged that the dog 10 will not engage the same until the car is partly loaded. The dog 10 is rotatable on the pin 6 and is held in normal position by the pin 13. As the brake is applied the hanger 7 engages dog 10 and they both rotate together on the pin 6. Should the car be loaded and hanger 7 raises, the dog 10 engages in ratchets 9 and holds hanger 7 from going back to normal position. It remains in this position as long as the brake is applied. On the mountain grades it assumes a set position as long as the retainers are cut in, and brake piston remains out. When the release takes place the dog 10 rotates back against pin 13 which forms a stop while the hanger 7 travels away from the dog 10. If the car is loaded and hanger 7 has raised, then it travels to its normal position by sliding downward by means of its slot 7ª on the pin 6. In this position the car can be unloaded. Then when the brake is set again the hanger 7 travels over the axle freely and no action takes place with the valve mechanism.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A brake governor comprising a brake cylinder, a cylinder spaced therefrom, a port connecting said cylinders, a spring controlled valve in said port, a reducing reservoir connected with said second named cylinder, and means for communicating said reservoir with said first named cylinder through said spring controlled valve.

2. A brake governor comprising a brake cylinder, a cylinder spaced therefrom, a port connecting said cylinders, a spring controlled valve in said port, a reducing reservoir connected with said second named cylinder, and another spring controlled valve communicating from said second named cylinder to said port.

3. A brake governor comprising a car, a means movable vertically below the body of the car and adapted to impinge upon an object fixed independently with respect to the body of the car, means for swinging said means back and forth, a brake means, and means for controlling the braking power of said brakes by means of the movement of said swinging means, as described.

4. A brake governor comprising a car movable vertically, a swinging arm suspended beneath said car, such arm being also movable vertically, a brake means, means for swinging said arm each time the brakes are set, said arm impinging upon an object fixed independently of said car, to move said arm vertically as said car moves downward, a ratchet means for maintaining said arm in such position when it swings in one direction and means for releasing said ratchet means when said arm swings in the other direction, and means for controlling the braking power of said brake means by the movement of said arm.

In testimony whereof I affix my signature in presence of two witnesses.

ULYSSES S. SMITH.

Witnesses:
 Wm. H. Westlake,
 Gladys Toll.